(12) United States Patent
Tamura et al.

(10) Patent No.: US 10,424,851 B2
(45) Date of Patent: Sep. 24, 2019

(54) TERMINAL MOUNTING STRUCTURE FOR VEHICLE MOTOR DRIVE DEVICE

(71) Applicants: Shiro Tamura; Takanori Ishikawa; Shinya Taikou

(72) Inventors: Shiro Tamura, Shizuoka (JP); Takanori Ishikawa, Shizuoka (JP); Shinya Taikou, Shizuoka (JP)

(73) Assignee: NTN CORPORATION, Osaka (JP)

( * ) Notice: Subject to any disclaimer, the term of this patent is extended or adjusted under 35 U.S.C. 154(b) by 108 days.

(21) Appl. No.: 15/504,348

(22) PCT Filed: Aug. 10, 2015

(86) PCT No.: PCT/JP2015/072611
§ 371 (c)(1),
(2) Date: Feb. 16, 2017

(87) PCT Pub. No.: WO2016/027711
PCT Pub. Date: Feb. 25, 2016

(65) Prior Publication Data
US 2017/0237185 A1 Aug. 17, 2017

(30) Foreign Application Priority Data
Aug. 21, 2014 (JP) ................... 2014-168638

(51) Int. Cl.
*H01R 4/70* (2006.01)
*H01R 4/34* (2006.01)
(Continued)

(52) U.S. Cl.
CPC ............. *H01R 4/70* (2013.01); *B60L 50/51* (2019.02); *H01R 4/34* (2013.01); *H01R 9/18* (2013.01);
(Continued)

(58) Field of Classification Search
CPC ..... H01R 4/70; H01R 9/24; H01R 4/34; H01R 9/18; B60L 11/18; B60L 11/1803; H02K 5/22; H02K 5/225
(Continued)

(56) References Cited

U.S. PATENT DOCUMENTS 7,607,220 B2 * 10/2009 Reed .................. B60K 6/26
29/464
7,893,581 B2 * 2/2011 Miura ................. H02K 5/225
310/71
(Continued)

FOREIGN PATENT DOCUMENTS

EP 2039932 3/2009
JP 57-140189 9/1982
(Continued)

OTHER PUBLICATIONS

JP 2008098007 A machine translation Sep. 27, 2018.*

*Primary Examiner* — Quyen P Leung
*Assistant Examiner* — Leda T Pham
(74) *Attorney, Agent, or Firm* — Clark & Brody

(57) ABSTRACT

A terminal mounting structure includes a plurality of receive-side terminals, each of which extends from a distal end of each of electrical leads, a mounting stand that includes an electrically-insulating base and a plurality of supply-side conductive bars that are disposed at intervals and extend so as to pass through the base, a plurality of screws, each of which passes through the receive-side terminal in a direction crossing an extending direction of the receive-side terminal, each of which is screwed into a screw hole formed at an end part of the supply-side conductive bar so as to cause each of the receive-side terminals to contact each of the supply-side conductive bars and to fix each of the receive-side terminals to each of the supply-side conductive bars, and a contact prevention mechanism that is provided in
(Continued)

the mounting stand so as to prevent adjacent receive-side terminals from contacting with each other.

8 Claims, 12 Drawing Sheets

(51) Int. Cl.
    *H01R 9/18* (2006.01)
    *H02K 5/22* (2006.01)
    *H01R 9/24* (2006.01)
    *B60L 50/51* (2019.01)
(52) U.S. Cl.
    CPC .............. *H01R 9/24* (2013.01); *H02K 5/22* (2013.01); *H02K 5/225* (2013.01)
(58) Field of Classification Search
    USPC ............................................................ 310/71
    See application file for complete search history.

(56) References Cited

U.S. PATENT DOCUMENTS

| 9,583,990 | B2 * | 2/2017 | Tokunaga | H02K 5/225 |
| 2012/0190250 | A1 | 7/2012 | Patel et al. | |
| 2013/0252479 | A1 | 9/2013 | Ramey et al. | |
| 2014/0062234 | A1 * | 3/2014 | Tamura | H02K 5/225 310/71 |

FOREIGN PATENT DOCUMENTS

| JP | 62-183366 | 11/1987 | |
| JP | 06-15272 | 2/1994 | |
| JP | 2004-153891 | 5/2004 | |
| JP | 2008-098007 | 4/2008 | |
| JP | 2008098007 A * | 4/2008 | ............ H01R 9/22 |
| JP | 2009-022090 | 1/2009 | |
| JP | 2010-172069 | 8/2010 | |
| JP | 2014-050238 | 3/2014 | |
| JP | 2014-050258 | 3/2014 | |

* cited by examiner

TO VEHICLE FRONT

TERMINAL MOUNTING STRUCTURE FOR VEHICLE MOTOR DRIVE DEVICE

TECHNICAL FIELD

The present invention relates to a vehicle motor drive device that drives a wheel of an electric car, a hybrid car, and the like and in particular to a structure for mounting a terminal of a motor coil on a conductive bar on a power supply side in the vehicle motor drive device.

BACKGROUND ART

For example, the vehicle motor drive device described in Japanese Unexamined Patent Application Publication No. 2010-172069 (Patent Literature 1) has been conventionally known as an in-wheel motor drive device that is disposed in an inner space area of a road wheel of a wheel or as an on-board motor drive device that is incorporated in a vehicle body to drive a wheel via a drive shaft. A vehicle motor drive device such as an in-wheel motor drive device and an on-board motor drive device is connected to a power cable extending from outside of the vehicle motor drive device and power is supplied from the power cable to the vehicle motor drive device.

In the vehicle motor drive device described in Patent Literature 1, electrical wiring within the vehicle motor drive device is unclear. Particularly, the electrical wiring from a distal end of a power cable drawn from outside into the vehicle motor drive device to a stator coil of a motor portion of the vehicle motor drive device is unclear.

The inner space of the vehicle motor drive device is cut off from outside of the vehicle motor drive device so that foreign matters do not enter the vehicle motor drive device from the outside. It is conceivable that a terminal structure is provided on a casing of the vehicle motor drive device that functions as a partition between the inner space of the vehicle motor drive device and the outside, a distal end of the power cable placed in the outside is connected to the terminal structure, and a terminal of the stator coil placed in the inner space is also connected to the terminal structure, so that the power cable is connected via the terminal structure to the stator coil.

CITATION LIST

Patent Literature

PTL 1: Japanese Unexamined Patent Application Publication No. 2010-172069

SUMMARY OF INVENTION

Technical Problem

The present inventors have found that there are problems in the terminal structure described above, as described below. A vehicle motor drive device includes a large number of rotating components such as a shaft and a gear and these rotating components rotate at various rotation speeds, and thus the vehicle motor drive device vibrates during a drive operation. Particularly, an in-wheel motor drive device is mounted on a vehicle body via a suspension device, and thus the in-wheel motor drive device bounces and rebounds and repeatedly receives lateral force from tires of wheels at the time of turning, acceleration force at the time of start, and speed reduction force at the time of braking. When various vibrations and force act on the terminal structure for a long period of time, screws used in the terminal structure become loose and terminals may rotate about these loose screws. When two or more terminals are arranged side by side, a short-circuit of the terminals may occur because of the rotation of the terminals.

Further, it is difficult to visually check the inside of the vehicle motor drive device in daily inspection and maintenance. Even if a screw becomes loose, it is desirable to prevent a short-circuit of terminals.

In view of the above problems, an object of the invention is to prevent a short-circuit of terminals of a motor coil disposed in a vehicle motor drive device.

Solution to Problem

To achieve the object, a terminal mounting structure for a vehicle motor drive device according to the present invention includes a plurality of electrical leads that extend from a motor coil of the vehicle motor drive device, a plurality of receive-side terminals each of which extends from a distal end of each of the electrical leads, a mounting stand that includes an electrically-insulating base and a plurality of supply-side conductive bars that are disposed at intervals and extend so as to pass through the base, a plurality of screws each of which passes through the receive-side terminal in a direction crossing an extending direction of the receive-side terminal, each of which is screwed into a screw hole formed at an end part of the supply-side conductive bar so as to cause each of the receive-side terminals to contact each of the supply-side conductive bars and to fix each of the receive-side terminals to each of the supply-side conductive bars, and a contact prevention mechanism that is provided in the mounting stand so as to prevent adjacent receive-side terminals from contacting with each other.

According to the present invention, even if a screw becomes loose and a receive-side terminal extending from the distal end of an electrical lead rotates about the screw, the receive-side terminal only abuts against a contact prevention mechanism that is placed between adjacent receive-side terminals and thus it is possible to prevent the adjacent receive-side terminals from abutting against each other and a short-circuit from occurring between the receive-side terminals. For example, as a structure for enabling the screw to pass through the receive-side terminal, the receive-side terminal includes a hole that passes through the receive-side terminal in a direction crossing the extending direction of the receive-side terminal. Alternatively, the receive-side terminal is a plate piece, a cutout is formed in a part of the plate piece and thus the remaining part of the plate piece has a square U-shape, so that the screw passes the plate piece through the cutout in a thickness direction of the plate piece.

The structure of the contact prevention mechanism is not particularly limited. For example, the contact prevention mechanism is a cover that covers each receive-side terminal. According to an embodiment of the present invention, the contact prevention mechanism includes a restricting member that restricts a rotation of the receive-side terminal about the screw within a predetermined range. According to such an embodiment, even if any of a plurality of adjacent receive-side terminals rotates, the rotation range of the receive-side terminal is restricted and thus it is possible to prevent a short-circuit of the receive-side terminals.

The structure of the restricting member is not particularly limited. According to a preferable embodiment, the restricting member is a projection whose base end side is provided on an end part of the supply-side conductive bar or on the base and whose distal end side projects from the end part of the supply-side conductive bar so as to reach the receive-side terminal, the restricting member is disposed on one side and the other side of each receive-side terminal so as to be symmetrical to each other with respect to a center line of the receive-side terminal that extends in an extending direction of the receive-side terminal, and the restricting member restricts the rotation range of the receive-side terminal between a restricting member on one side and a restricting member on the other side.

The restricting member may be formed separately from the base, or may be integrally formed with the base. The restricting member provided at the end part of the supply-side conductive bar may be integrally formed with the supply-side conductive bar, or the separately formed restricting member may be mounted on the end part of the supply-side conductive bar. When the base end side of the restricting member is integrally formed with an outer periphery of the end part of the supply-side conductive bar, the restricting member on one side and the restricting member on the other side can be securely fixed to the supply-side conductive bar. Further, the restricting member can be made of a conductive material that is similar to that of the supply-side conductive bar. According to another embodiment of the present invention, the base end side of the restricting member may be embedded in a boundary of the supply-side conductive bar and the base and fixed to the boundary. According to yet another embodiment of the present invention, the base end side of the restricting member may be fitted into the end part of the supply-side conductive bar and fixed to the end part by a sleeve and the like.

The shape of the restricting member disposed on one side and the other side of each receive-side terminal is not particularly limited. According to an embodiment of the present invention, the restricting member on one side and the restricting member on the other side are a pair of walls extending along one side edge and the other side edge of the receive-side terminal, respectively. According to such an embodiment, the restricting member is a wall extending along a side edge of the receive-side terminal, and thus even if the receive-side terminal rotates, the wall-like restricting member is always interposed between a plurality of adjacent receive-side terminals and a short-circuit can thus be prevented. According to another embodiment of the present invention, the restricting member is not a wall but a pin and the like further extending from the end part of the supply-side conductive bar.

The paired walls functioning as a restricting member do not need to be connected to each other. Alternatively, the restricting member on one side and the restricting member on the other side may extend along a distal end edge of the receive-side terminal so as to be connected to each other. According to such an embodiment, a wall-like restricting member extends in a C-shape or a U-shape so as to surround an outer edge of each receive-side terminal. Accordingly, it is possible to reliably prevent a rotation and a short-circuit of each receive-side terminal.

While the restricting member is placed between a plurality of adjacent receive-side terminals in the embodiment in which a pair of restricting members constituted by a restricting member on one side and a restricting member on the other side is provided as described above, the present invention is not limited to the embodiment. It suffices that the contact prevention mechanism is a member that is disposed between the adjacent receive-side terminals and it is not necessary to provide the contact prevention mechanism in pairs. According to an embodiment of the present invention, the contact prevention mechanism is a wall that stands on a base surface of the base and extends so as to cross a reference line that connects adjacent receive-side terminals. According to such an embodiment, even if a screw becomes loose and a receive-side terminal that extends from a distal end of an electrical lead rotates about the screw, the receive-side terminal only abuts against the wall placed between the adjacent receive-side terminals and it is possible to prevent the adjacent receive-side terminals from abutting against each other and a short-circuit from occurring between the receive-side terminals. For example, the wall extends to be parallel to the extending direction of the receive-side terminal.

According to another embodiment of the present invention, a plurality of recssed parts that receive the respective receive-side terminals are formed in the base and the contact prevention mechanism is a part of the base that partitions adjacent recessed parts. According to such an embodiment, even if a screw becomes loose, it is possible to restrict a rotation of a receive-side terminal about the screw by a part of the base that partitions adjacent recessed parts.

Advantageous Effects of Invention

As described above, according to the present invention, even if a screw becomes loose and thus a supply-side conductive bar does not contact a receive-side terminal and is not fixed to the receive-side terminal, it is possible to prevent a short-circuit of adjacent receive-side terminals. Accordingly, even if a vibrating vehicle motor drive device is operated for a long period of time, a short-circuit of electrical leads of a motor coil does not occur in the vehicle motor drive device.

DESCRIPTION OF EMBODIMENTS

Figure 1:
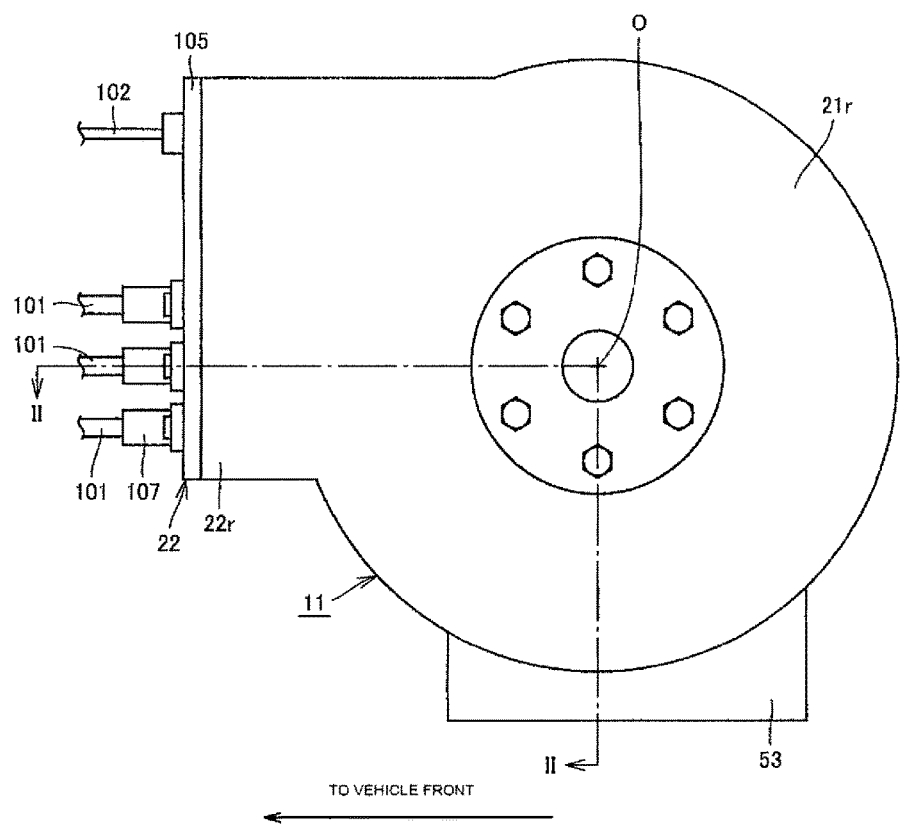
FIG. 1 is a rear view of a vehicle motor drive device.
Figure 2:
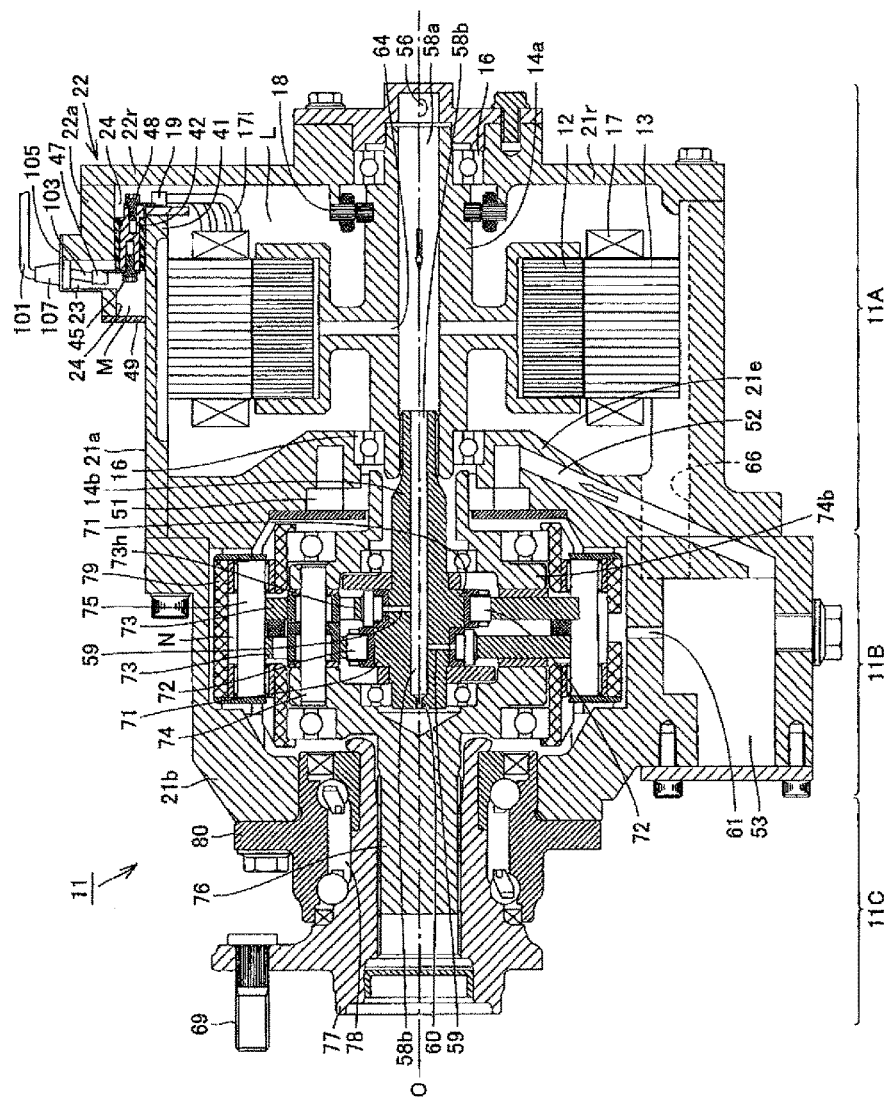
FIG. 2 is a longitudinal sectional view of the vehicle motor drive device taken along line II-II of FIG. 1, as viewed from an arrow direction.

Embodiments of the present invention are described in detail below with reference to the drawings. FIG. 1 is a rear view of a vehicle motor drive device including a terminal mounting structure according to the present invention, as viewed from a vehicle-width direction inner side of an electric car (an inboard side). FIG. 2 is a longitudinal sectional view of the vehicle motor drive device taken along line II-II of FIG. 1, as viewed from an arrow direction. The vehicle motor drive device is described first. An in-wheel motor drive device 11 shown in FIGS. 1 and 2 is a vehicle motor drive device that is provided within a wheel of an electric car or a hybrid vehicle, and is mounted via a suspension device (not shown) on a vehicle body.

As shown in FIG. 1, the in-wheel motor drive device 11 has a substantially cylindrical shape and includes a motor portion 11A, a speed reduction portion 11B, and a wheel hub bearing portion 11C that are sequentially and coaxially disposed in series in a direction of an axis O of the in-wheel motor drive device 11, as shown in FIG. 2. The wheel hub bearing portion 11C is disposed on a vehicle-width direction outer side of the electric car (an outboard side). The speed reduction portion 11B that is adjacent to the wheel hub bearing portion 11C has a larger diameter than that of the wheel hub bearing portion 11C. The motor portion 11A that is adjacent to the speed reduction portion 11B has a larger diameter than that of the speed reduction portion 11B, and is disposed on a vehicle-width direction center side of the electric car (the inboard side). A lubricant oil tank 53 is additionally disposed under the speed reduction portion 11B. The lubricant oil tank 53 projects toward an outer diameter side further than the motor portion 11A.

A casing 21a that forms the outer shape of the motor portion 11A has a substantially cylindrical shape as viewed from an axial direction of the in-wheel motor drive device 11, and is a fixed member that is non-rotatable about the axil O of the in-wheel motor drive device 11. A casing 21b that forms the outer shape of the speed reduction portion 11B is identical to the casing 21a. On the other hand, the wheel hub bearing portion 11C includes a rotating member (a hub ring 77) on an inner ring side and a fixed member on an outer ring side (an outer ring member 80). A wheel (not shown) is mounted on and fixed to the rotating member (the hub ring 77), so that rotational driving force of the motor portion 11A and vehicle weight are transmitted to the wheel. At this time, while the wheel hub bearing portion 11C and the speed reduction portion 11B are placed in an inner space area of the wheel, the motor portion 11A projects from the inner space area of the wheel toward the inboard side. A terminal box 22 that projects toward an outer diameter side of a front of the vehicle is formed on the casing 21a of the motor portion 11A (see FIG. 1).

As shown in FIG. 2, the motor portion 11A accommodates a rotor 12, a stator 13, and a motor shaft 14a of a rotating electric machine in a motor chamber L of the casing 21a. An axial direction end of the substantially cylindrical-shaped casing 21a is closed by a disc-shaped motor rear cover 21r. The stator 13 is mounted on and fixed to an inner peripheral surface of the casing 21a. The rotor 12 is disposed to be further toward an inner diameter side than the stator 13. The rotor 12 is mounted on and fixed to the motor shaft 14a extending along the axis O. A motor coil 17 of the stator 13 is electrically connected to three power lines 101. As alternating current is supplied from the power line 101 to the motor coil 17, the stator 13 of the motor portion 11A generates electromagnetic force to rotate the rotor 12 constituted by a permanent magnet or a magnetic body Each of the power lines 101 extends from an inverter (not shown) and is coated with an insulating material. One end of the motor shaft 14a is supported by the motor rear cover 21r via a rolling bearing 16. The other end of the motor shaft 14a is supported by a partition wall 21e via the rolling bearing 16.

The substantially cylindrical-shaped casing 21b defines a speed reduction chamber N and accommodates a speed reduction mechanism for the speed reduction portion 11B in the speed reduction chamber N. This speed reduction mechanism is a cycloidal reduction mechanism and includes an input shaft 14b, a pair of two eccentric members 71, two rolling bearings 72, two curve boards 73 whose outer peripheral part is formed in a wave shape, a plurality of inner pins 74, a plurality of outer pins 75, and an output shaft 76. The input shaft 14b of the speed reduction portion 11B is coupled and fixed to the motor shaft 14a of the motor portion 11A by spline fitting. The input shaft 14b and the motor shaft 14a extend along the axis O and integrally rotate, and thus are also referred to as a "motor-side rotating member". The eccentric members 71 are respectively provided on the input shaft 14b to be eccentric from the axis O at phases that are different from each other by 180°. Each of the two curve boards 73 has a center hole and an inner peripheral surface of this center hole is rotatably supported by an outer peripheral surface of each eccentric member 71 via each rolling bearing 72. Each of the outer pins 75 is fixed to an outer pin housing 79 that is elastically supported by the casing 21b to engage with the wavy-shaped outer peripheral part of the curve board 73, so that the curve board 73 revolving about the axis O at a high speed is slightly rotated. The inner pins 74 are mounted on and fixed to the output shaft 76 to pass through a plurality of through-holes 73h that are formed in the curve board 73 at predetermined intervals in a peripheral direction, in order to obtain only the rotation of the curve boards 73 and transmit the rotation to the output shaft 76. The rotational speed of the input shaft 14b is thus reduced by the speed reduction portion 11B and then the rotation is output from the output shaft 76. The speed reduction portion 11B functioning as a cycloidal reduction mechanism has a higher reduction rate than that of a speed reduction mechanism constituted by a planetary gear set or a parallel shaft gear set, and thus contributes to downsizing and weight reduction of the in-wheel motor drive device 11.

The hub ring 77 of the wheel hub bearing portion 11C is coupled and fixed to the output shaft 76. The hub ring 77 is rotatably supported by the outer ring member 80 via the rolling bearing 78. A road wheel of a wheel (not shown) is mounted on and fixed to the hub ring 77 via a bolt 69. The rolling bearing 78 has two rows, and for example, is a multiple-row angular ball bearing.

An operation principle of the in-wheel motor drive device 11 with the structure described above is schematically described. When electricity is applied to the motor portion 11A and power is supplied to the motor coil 17 of the stator 13, the rotor 12 rotates and the rotation is output from the motor shaft 14a to the input shaft 14b of the speed reduction portion 11B. The speed reduction portion 11B reduces a high speed rotation of the input shaft 14b and outputs a low speed rotation from the output shaft 76 to the hub ring 77 of the wheel hub bearing portion 11C. The speed reduction portion 11B has a cycloidal reduction mechanism, and thus as compared to a speed reduction mechanism constituted by a parallel shaft gear or by a planetary gear set, the speed reduction portion 11B is downsized, has a higher reduction ratio, and the weight thereof is reduced. Accordingly, a reduction ratio obtained by dividing the rotation number of the output shaft 76 by the rotation number of the input shaft 14b is in the range of 1/10 to 1/15.

A lubrication mechanism of the in-wheel motor drive device 11 is further described. The in-wheel motor drive device 11 includes a lubricant oil circuit with a shaft-center oil supply system and lubricates the motor portion 11A and the speed reduction portion 11B. Specifically, a lubricant oil pump 51 is provided on the partition wall 21e of the casing that functions as a boundary of the motor chamber L that accommodates therein the motor portion 11A and the speed reduction chamber N that accommodates therein the speed reduction portion 11B. The lubricant oil pump 51 is disposed coaxially with the axis O and is driven by an inner pin reinforcing member 74b fixed to the inner pin 74. That is, the lubricant oil pump 51 is driven by an output rotation of the speed reduction portion 11B. A suction oil path 52 that is formed in the partition wall 21e extends vertically, an upper end of the suction oil path 52 is connected to a suction port of the lubricant oil pump 51, and a lower end of the suction oil path 52 is connected to the lubricant oil tank 53 that is provided under the speed reduction portion 11B. An ejection oil path (not shown) that is formed in the wall thickness of the partition wall 21e and the wall thickness of the casing 21a extends from an ejection port of the lubricant oil pump 51 to the motor rear cover 21r.

Among both ends of the ejection oil path (not shown), an end on a side of the motor rear cover 21r is connected to an outer diameter side end of a communication oil path 56 (only an inner diameter side end is shown in FIG. 2) that is formed in the wall thickness of the motor rear cover 21r. The communication oil path 56 extends between an inner wall surface and an outer wall surface of the motor rear cover 21r that becomes a disc-shaped wall in a radial direction. The inner diameter side end of the communication oil path 56 is connected to a motor shaft oil path 58a that is provided in the motor shaft 14a as shown in FIG. 2.

The motor shaft oil path 58a is provided inside of the motor shaft 14a and extends along the axis O. One end of the motor shaft oil path 58a near the speed reduction portion 11B is connected to a speed-reduction-portion input shaft oil path 58b that is provided in the input shaft 14b and extends along the axis O. The other end of the motor shaft oil path 58a far from the speed reduction portion 11B (the end on a side of the motor rear cover 21r) is connected to the communication oil path 56 described above. Further, the motor shaft oil path 58a is also connected to an inner diameter side end of a rotor oil path 64 that is formed in a rotor flange part of an axial direction center part.

The speed-reduction-portion input shaft oil path 58b is provided inside of the input shaft 14b and extends between both ends of the input shaft 14b along the axis O. A lubricant oil hole 60 is provided at one end of the speed-reduction-portion input shaft oil path 58b that is opposite to the output shaft 76. The lubricant oil hole 60 communicates with the speed reduction chamber N.

The speed-reduction-portion input shaft oil path 58b branches to a lubricant oil path 59 that extends radially outward in each eccentric member 71. An outer diameter side end of the lubricant oil path 59 is connected to the rolling bearing 72 that is provided between an outer peripheral surface of the eccentric member 71 and an inner peripheral surface of the curve board 73.

A speed-reduction-portion return hole 61 is provided at the bottom of the speed reduction chamber N. The speed-reduction-portion return hole 61 passes through the substantially cylindrical-shaped casing 21b in a radial direction to cause the speed reduction chamber N to communicate with the lubricant oil tank 53. A motor-portion return hole 66 is provided at the bottom of the motor chamber L. The motor-portion return hole 66 passes through the partition wall 21e in a direction of the axis O to cause the motor chamber L to communicate with the lubricant oil tank 53.

An operation of the lubricant oil circuit is described. The lubricant oil pump 51 driven by the output shaft 76 via the inner pin reinforcing member 74b sucks lubricant oil stored in the lubricant oil tank 53 through the suction oil path 52 as indicated by a white blank arrow in FIG. 2 and ejects the lubricant oil to an ejection oil path (not shown). The lubricant oil is pressurized by the lubricant oil pump 51 and sequentially flows in the ejection oil path (not shown), the communication oil path 56, and the motor shaft oil path 58a. A part of the lubricant oil flowing in the motor shaft oil path 58a flows in the rotor oil path 64 and is injected from an outer peripheral surface of the rotor 12 to the motor chamber L. The lubricant oil then flows toward the bottom of the motor chamber L by gravity, passes through the motor portion return hole 66, and returns to the lubricant oil tank 53. In this way, the motor portion 11A is cooled and lubricated by the shaft-center oil supply system. The motor chamber L is filled with droplets of the injected lubricant oil and thus in an oil atmosphere.

The lubricant oil flowing from the motor shaft oil path 58a into the speed-reduction-portion input shaft oil path 58b branches to flow in the lubricant oil path 59 and the lubricant oil hole 60 and then to be injected to the speed reduction chamber N. As a result, the lubricant oil is adhered to the eccentric member 71, the rolling bearing 72, the curve board 73, the inner pin 74, and the outer pin 75 of the speed reduction portion 11B. Next, the lubricant oil flows toward the bottom of the speed reduction chamber N by gravity, passes through the speed-reduction-portion return hole 61, and returns to the lubricant oil tank 53. In this way, the speed reduction portion 11B is cooled and lubricated by the shaft-center oil supply system. The speed reduction chamber N is filled with droplets of the injected lubricant oil and thus in an oil atmosphere.

As shown in FIG. 1, the terminal box 22 is formed on an outer periphery of the casing 21a of the motor portion 11A. The terminal box 22 projects toward a front of the vehicle and includes a cover plate 105 that closes a distal end opening of the terminal box 22. Four through-holes are formed in the cover plate 105, and three power lines 101 and a signal line 102 are drawn through these through holes into the in-wheel motor drive device 11. As shown in FIG. 2, each power line 101 is a flexible electrical cable that includes a conductive core line 103 and an insulating outer cover that covers the core line 103. A U phase, a V phase, and a W phase of three-phase alternating current flow in the power lines 101, respectively. A distal end part of each power line 101 passes through a sleeve 107. Each sleeve 107 connects the outer cover of the power line 101 to the cover plate 105 under a sealed state. For this reason, each core line 103 that passes through the cover plate 105 to be drawn into the terminal box 22 is cut off from outside of the in-wheel motor drive device 11.

The signal line 102 is a cable obtained by bundling a plurality of core lines having insulating coating separately applied thereto into one line. The signal line 102 is connected via the terminal box 22 to a plurality of sensors installed in the in-wheel motor drive device 11. For example, the plurality of sensors may be a rotation number sensor 18 and a temperature sensor (not shown).

As shown in FIG. 2, the terminal box 22 is disposed to be close to the motor rear cover 21r of the casing 21a and thus interference of the terminal box 22 with a wheel (not shown) is prevented. A casing of the terminal box 22 is formed in a substantially rectangular parallelepiped box shape. The casing is divided into a first casing 22a and a second casing 22r, and the first casing 22a is tightly joined to the second casing 22r. The first casing 22a is integrally formed with the casing 21a. The second casing 22r is integrally formed with the motor rear cover 21r.

As shown in FIG. 1, the terminal box 22 projects toward a front of the vehicle. As shown in FIG. 2, an opening 23 that communicates with the outside of the in-wheel motor drive device 11 is provided on a projecting end side of the terminal box 22. A partition wall 41 between an inner space M of the terminal box 22 and the motor chamber L is provided on a base end side of the terminal box 22. The partition wall 41 is integrally formed with the casing 21a and is a cylindrical part that has the same diameter as that of the casing 21a. The partition wall 41 is made of a light alloy such as aluminum, similarly to the first casing 22a and the casing 21a.

As shown in FIG. 2, an outer peripheral surface of the partition wall 41 faces an inner wall surface of the first casing 22a, and a path 24 is defined between the partition wall 41 and the first casing 22a. One end of the path 24 extending in parallel to the axis O communicates with the motor chamber L and the other end of the path 24 communicates with the inner space M of the terminal box 22. The one end of the path 24 is sealed by the second casing 22r. The other end of the path 24 is sealed by a cover 49. The cover 49 is removably mounted on and fixed to the first casing 22a.

A mounting stand 42 for a terminal mounting structure is provided in the middle of the path 24. The mounting stand 42 blocks the path 24 in the middle thereof. Accordingly, one end of the mounting stand 42 faces the motor chamber L and the other end of the mounting stand 42 faces the inner space M. The motor chamber L does not communicate with the inner space M. The mounting stand 42 includes a screw 48 that is screwed into the one end of the mounting stand 42 on a side of the motor chamber L and a screw 45 that is screwed into the other end of the mounting stand 42 on a side of the inner space M. A head part of the screw 48 faces the second casing 22r, and thus it is possible to prevent the screw 48 from coming off of the mounting stand 42. A head part of the screw 45 faces the cover 49, and thus it is possible to prevent the screw 45 from coming off of the mounting stand 42.

Figure 3:
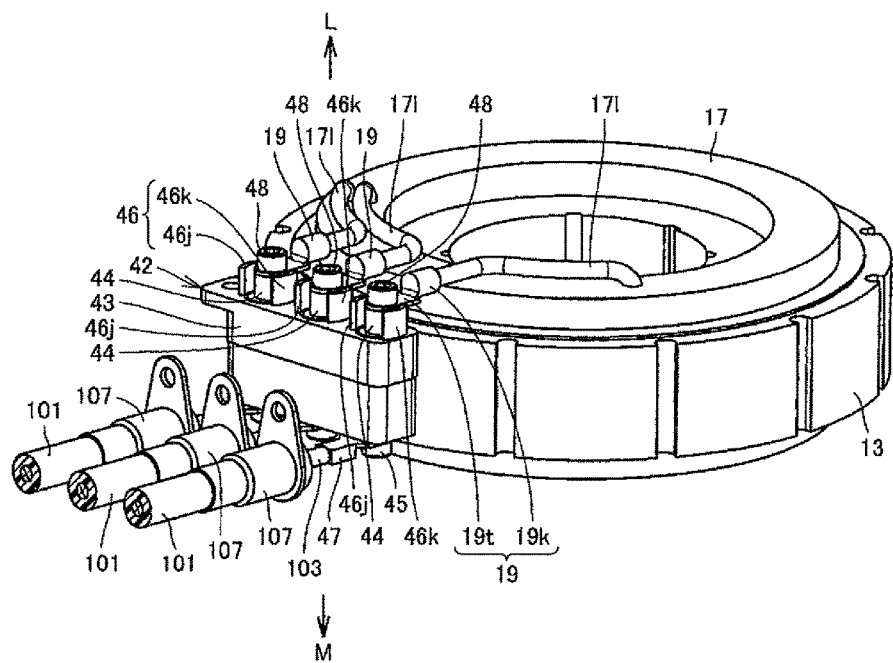
FIG. 3 is a perspective view of a motor coil and a terminal mounting structure according to a first embodiment that are taken out of the vehicle motor drive device.
Figure 4:
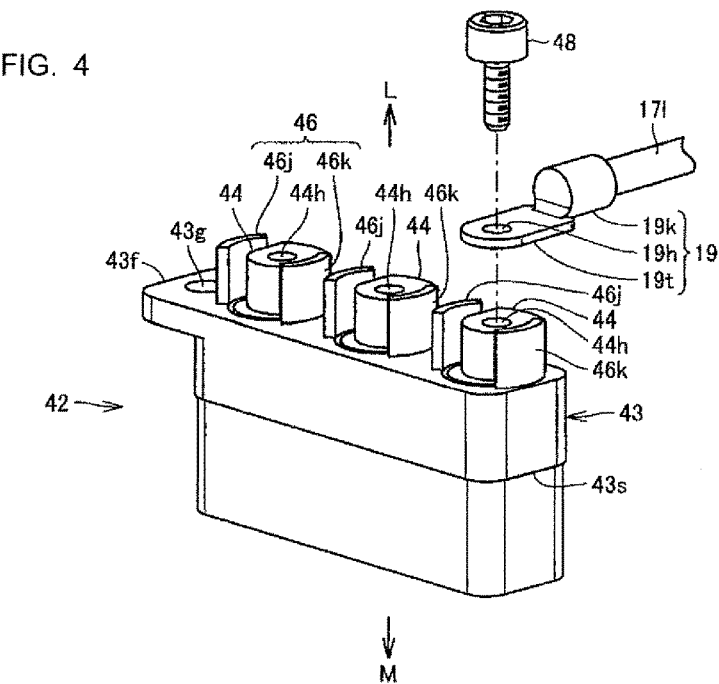
FIG. 4 is an exploded perspective view of the taken out terminal mounting structure according to the first embodiment.
Figure 5:
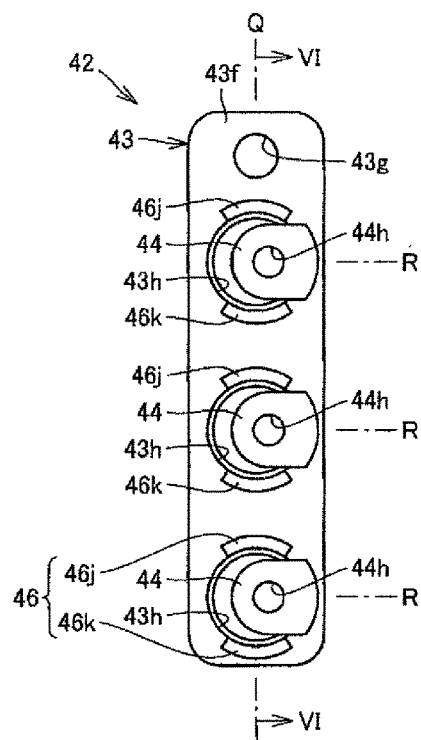
FIG. 5 is an explanatory view of a taken out mounting stand according to the first embodiment.
Figure 6:
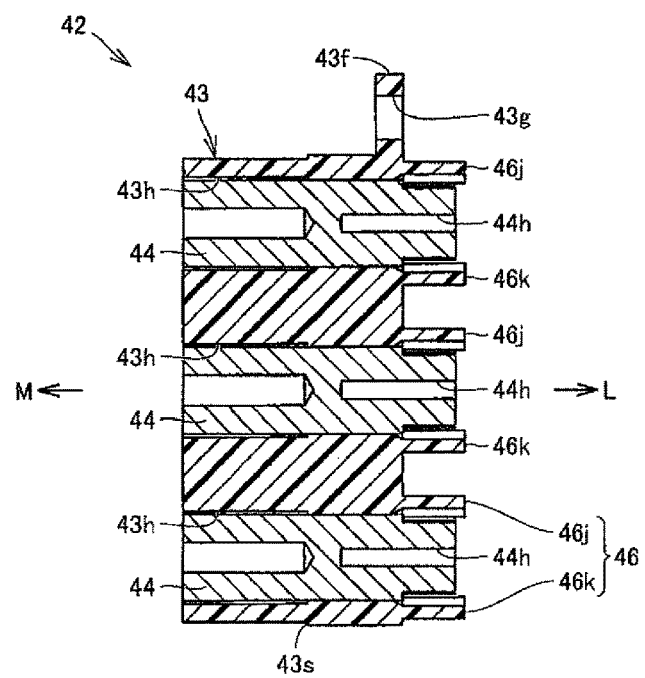
FIG. 6 is a cross-sectional view of the mounting stand taken along line of VI-VI of FIG. 5, as viewed from an arrow direction.

FIG. 3 is a schematic perspective view of a power line, a stator, a motor coil, and a terminal mounting structure connecting a terminal of the motor coil to the power line that are taken out of a vehicle motor drive device. FIG. 4 is an exploded perspective view of the taken out terminal mounting structure shown in FIG. 3. FIG. 5 is an explanatory view of a taken out mounting stand as viewed from a side of the motor chamber L in a longitudinal direction of a conductive bar. FIG. 6 is a cross-sectional view of the mounting stand taken along line VI-VI of FIG. 5, as viewed from an arrow direction. FIGS. 3 to 6 show a terminal mounting structure according to a first embodiment.

With reference to FIG. 3, three electrical leads 17l extend from the motor coil 17. An outer periphery of each of the electrical leads 17l is coated. A receive-side terminal 19 is fixed to a distal end of each electrical lead 17l by caulking. The receive-side terminal 19 further extends from the distal end of the electrical lead 17l, and includes a caulk part 19k that covers the distal end of the electrical lead 17l and a plate-like tongue piece 19t that extends from the caulk part 19k in an extending direction of the electrical lead 17l. A through-hole 19h is formed in the tongue piece 19t (see FIG. 4). A direction of the through-hole 19h is perpendicular to an extending direction of the receive-side terminal 19. The mounting stand 42, the receive-side terminal 19, and a supply-side terminal 47 that constitute the terminal mounting structure are disposed on an outer diameter side of the stator 13 and the motor coil 17. Although not shown in FIG. 3, the partition wall 41 is interposed between the mounting stand 42 and the stator 13.

With reference to FIGS. 4 to 6, the mounting stand 42 includes a block-like base 43, three conductive bars 44, and three pairs of restricting members 46j, 46k. The base 43 that is a main body of the mounting stand 42 is formed in a substantially rectangular parallelepiped shape and is made of an insulating material, for example, a polymer material such as a heat-resistant resin. A step 43s, three through-holes 43h, and an ear-like fixing piece 43f are formed in the base 43. The step 43s is placed between an end part of the base 43 on a side of the inner space M and an end part of the base 43 on a side of the motor chamber L. The step 43s is a band-like flat surface extending around the base 43 and is oriented toward the side of the inner space M.

The three through-holes 43h extend from the end part of the base 43 on the side of the inner space M to the end part of the base 43 on the side of the motor chamber L so as to be parallel to each other. The fixing piece 43f is disposed at the end part of the base 43 on the side of the motor chamber L. A fixing hole 43g that is parallel to the through-hole 43h is formed in the fixing piece 43f so as to pass through the fixing piece 43f. These three through-holes 43h and fixing hole 43g are arranged in parallel in a line. As a fixing screw (not shown) passes through the fixing hole 43g and a distal end of the fixing screw is screwed into a female screw hole (not shown) formed in the partition wall 41, the mounting stand 42 is mounted on and fixed to the partition wall 41 (FIG. 2). Each conductive bar 44 is fitted into each through-hole 43h. An inner peripheral surface of the through-hole 43h contacts an outer peripheral surface of the conductive bar 44 without any gap and both end parts of the conductive bar 44 are exposed on both end surfaces of the base 43.

Each conductive bar 44 is made of a conductive body such as copper, a copper alloy, and other metals, extends linearly, and has flat both end surfaces. A female screw hole 44h is formed in the end surface of the conductive bar 44 on the side of the motor chamber L. The female screw hole 44*h* extends to be parallel to a longitudinal direction of the conductive bar 44. As shown in FIG. 5, an end part of the conductive bar 44 on the side of the motor chamber L is formed to be eccentric from a center axis of the conductive bar 44. An eccentric direction is directed to the motor coil 17. Accordingly, a cross-section of the conductive bar 44 at the end part on the side of the motor chamber L is not a circular cross-section with the female screw hole 44*h* being the center but a deformed cross-section in which with respect to the female screw hole 44*h*, a side near the motor coil 17 is large and a side far from the motor coil 17 is small.

The plurality of conductive bars 44 are aligned on a reference line Q at intervals and extend in parallel to each other to be perpendicular to the reference line Q. The receive-side terminal 19 is fixed to the end part of each conductive bar 44 on the side of the motor chamber L. Specifically, as shown in FIG. 4, the screw 48 passes through the through hole 19*h* of each receive-side terminal 19 and a distal end part of the screw 48 is screwed into the female screw hole 44*h* of the conductive bar 44. By rotating and tightening the screw 48, the screw 48 causes the tongue piece 19*t* to surface-contact an end surface of the conductive bar 44. The supply-side terminal 47 is mounted on and fixed to the end part of each conductive bar 44 on the side of the inner space M (FIG. 2) by the screw 45 that is similar to the screw 48. The supply-side terminal 47 is fixed to a distal end of the core line 103 of each power line 101 by caulking.

As current sequentially flows from the core line 103 of the power line 101 through the supply-side terminal 47, the conductive bar 44, and the receive-side terminal 19 into the electrical lead 171, power is supplied to the motor coil 17. Accordingly, the conductive bar 44 is a supply-side component as viewed from the receive-side terminal 19.

With reference to FIGS. 4 to 6, a pair of restricting members 46*j*, 46*k* is provided for each conductive bar 44 on the end part of the mounting stand 42 on the side of the motor chamber L. The restricting members 46*j*, 46*k* are disposed to be symmetrical to each other with respect to a center line R of the receive-side terminal 19 extending along an extending direction of the receive-side terminal 19 (see FIG. 5). The restricting member 46*j* is a wall that extends in an arc shape along one side of the tongue piece 19*t*, and the restricting member 46*k* is a wall that extends in an arc shape along the other side of the tongue piece 19*t*. The shape of the restricting member 46*j* on one side of the tongue piece 19*t* is the same as that of the restricting member 46*k* on the other side of the tongue piece 19*t*, and thus these restricting members 46*j*, 46*k* are simply referred to as the "restricting member 46" when the restricting member 46*j* on one side of the tongue piece 19*t* is not particularly distinguished from the restricting member 46*k* on the other side of the tongue piece 19*t*. The wall-like restricting member 46 extends from a base end side of the receive-side terminal 19 to a distal end side thereof across the reference line Q. The center line R is perpendicular to an axis of the female screw hole 44*h*.

As shown in FIG. 6, three pairs of restricting members 46*j*, 46*k* are integrally formed with the base 43 and restricting members 46*j*, 46*k* of each pair face an end part of each conductive bar 44 with a gap being interposed therebetween. Further, three pairs of restricting members 46*j*, 46*k* stand from the end surface of the base 43 and project over the end part of each conductive bar 44 toward the side of the motor chamber L. Accordingly, a projecting end of each restricting member 46 reaches the tongue piece 19*t* of the receive-side terminal 19, as shown in FIG. 3. That is, the projecting end of the restricting member 46 projects further than the end surface of the conductive bar 44 which contacts the tongue piece 19*t* and to which the tongue piece 19*t* is fixed.

According to the terminal mounting structure of the first embodiment shown in FIG. 3, the restricting member 46 functions as a contact prevention mechanism and prevents adjacent receive-side terminals 19, 19 from contacting with each other. Specifically, the receive-side terminal 19 is screwed between a pair of restricting members 46*j*, 46*k*, and even if the screw 48 becomes loose and the receive-side terminal 19 rotates about the screw 48, the rotation range of the receive-side terminal 19 is restricted by this pair of restricting members 46*j*, 46*k*. Accordingly, there is no possibility that adjacent receive-side terminals 19, 19 contact with each other and a short-circuit occurs between the receive-side terminals 19, 19.

According to the first embodiment, three pairs of restricting members 46*j*, 46*k* are provided and each restricting member 46 is disposed at an end part of each of three conductive bars 44. Therefore, even if any of three screws 48 becomes loose, it is possible to prevent a short-circuit of adjacent receive-side terminals 19, 19. Although not shown, even if a pair of restricting members 46*j*, 46*k* is provided only at a center conductive bar 44 of the three conductive bars 44, it is possible to prevent a short-circuit of adjacent receive-side terminals 19, 19. This is because the restricting member 46 is placed between the adjacent receive-side terminals 19, 19.

Figure 7:
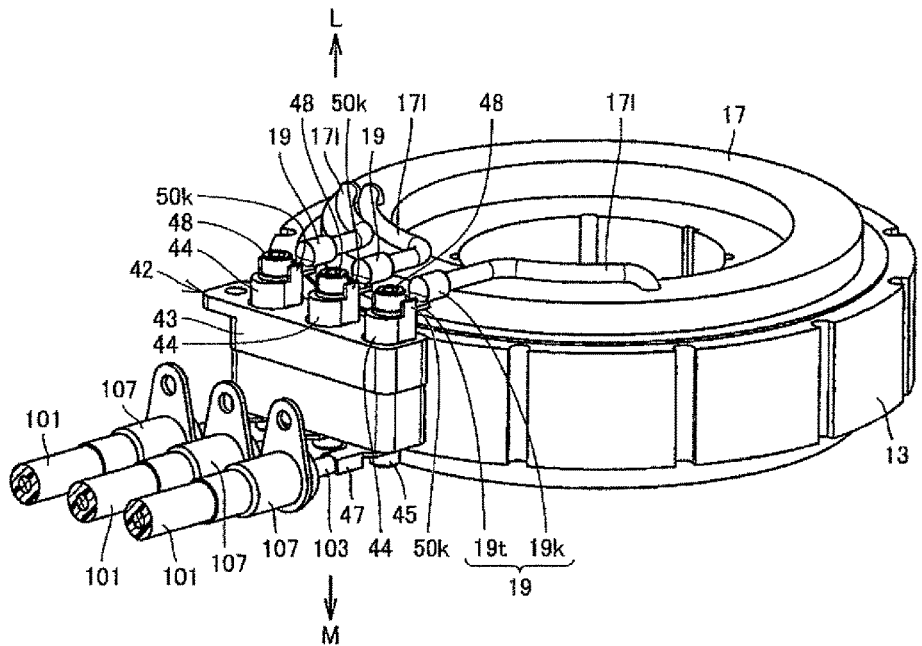
FIG. 7 is a perspective view of a taken out motor coil and a taken out terminal mounting structure according to a second embodiment.
Figure 8:
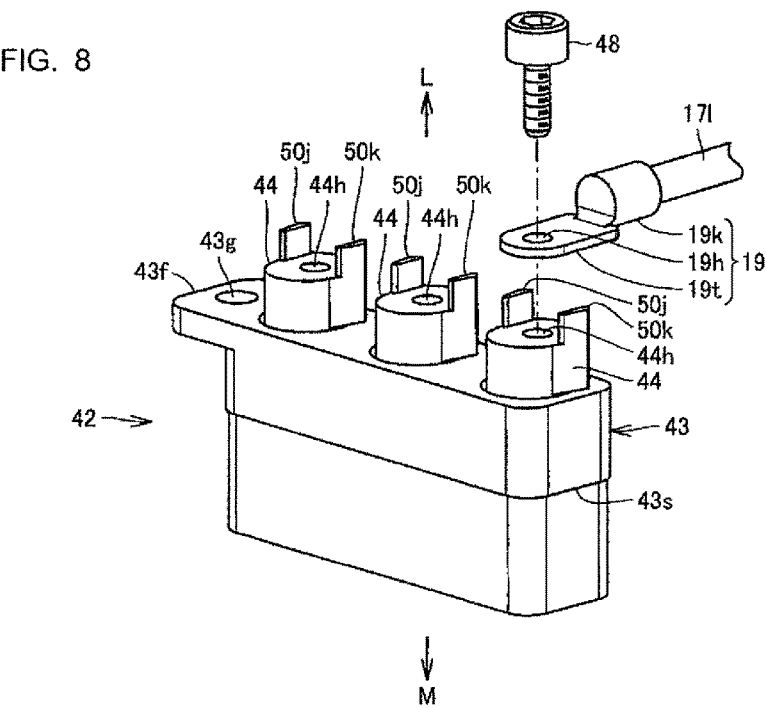
FIG. 8 is an exploded perspective view of a taken out mounting stand according to the second embodiment.
Figure 9:
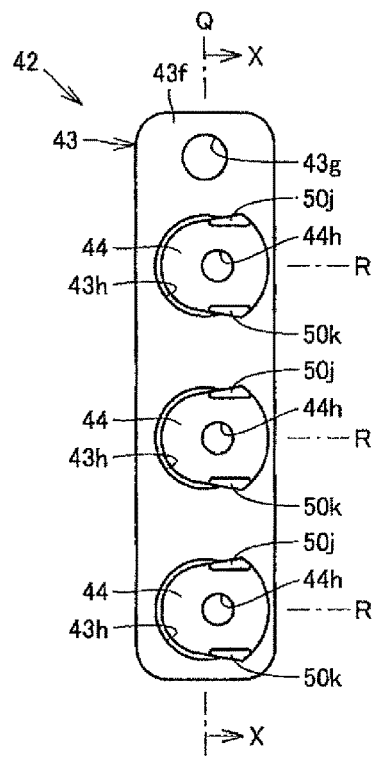
FIG. 9 is an explanatory view of the taken out mounting stand according to the second embodiment.
Figure 10:
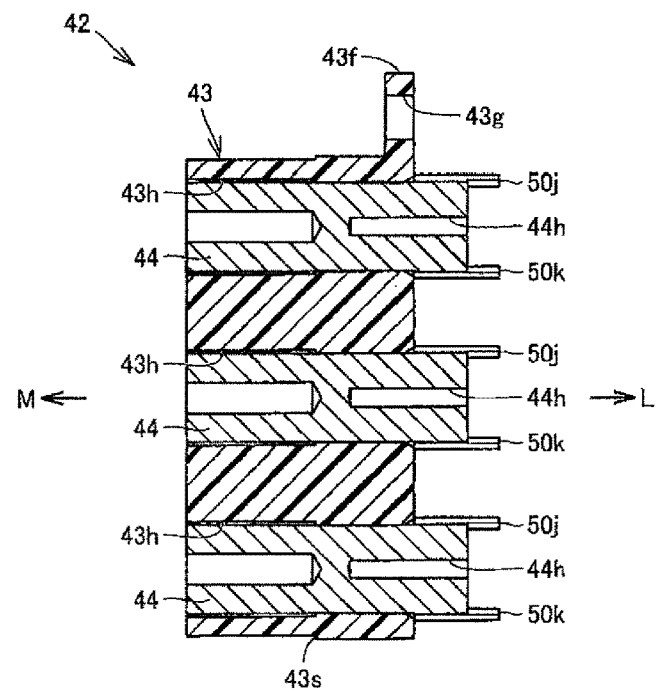
FIG. 10 is a cross-sectional view of the mounting stand taken along line X-X of FIG. 9, as viewed from an arrow direction.

Next, a second embodiment of the present invention is described. FIG. 7 is a schematic perspective view of a power line, a stator, a motor coil, and a terminal mounting structure according to the second embodiment that are taken out of a vehicle motor drive device. FIG. 8 is an exploded perspective view of the taken out terminal mounting structure shown in FIG. 7. FIG. 9 is an explanatory view of a taken out mounting stand as viewed from a side of a motor chamber L in a longitudinal direction of a conductive bar. FIG. 10 is a cross-sectional view of the mounting stand taken along line X-X of FIG. 9, as viewed from an arrow direction. In the second embodiment, the structure that is common to that of the embodiment described above is denoted by the same reference numeral and the description thereof is omitted. Only a structure that is different from that of the embodiment described above is described below.

A pair of restricting members 50*j*, 50*k* is integrally formed with an end part of each conductive bar 44 according to the second embodiment. Similarly to a pair of restricting members 46*j*, 46*k*, the restricting members 50*j*, 50*k* are disposed on one side and the other side so as to be symmetrical to each other with respect to a center line R and project from an end surface of the conductive bar 44 on the side of the motor chamber L to the side of the motor chamber L so as to reach a receive-side terminal 19. That is, projecting ends of the restricting members 50*j*, 50*k* project further than the end surface of the conductive bar 44 which contacts a tongue piece 19*t* of the receive-side terminal 19 and to which the tongue piece 19*t* is fixed. The restricting member 50*j* extends along one side of the receive-side terminal 19 like a wall, and the restricting member 50*k* extends along the other side of the receive-side terminal 19 like a wall. The wall-like restricting members 50*j*, 50*k* are disposed on a base end side of the receive-side terminal 19 and do not extend across a reference line Q.

According to the terminal mounting structure of the second embodiment shown in FIG. 7, the restricting members 50*j*, 50*k* function as a contact prevention mechanism and prevent adjacent receive-side terminals 19, 19 from contacting with each other. Specifically, each receive-side terminal 19 is screwed between a pair of 50*j*, 50*k*. The receive-side terminal 19 is thus positioned between a pair of restricting members 50*j*, 50*k* and does not rotate about a screw 48. Even if the screw 48 becomes loose, there is no possibility that adjacent receive-side terminals 19, 19 contact with each other and a short-circuit occurs between the receive-side terminals 19, 19. Although not shown, as a modified example of the second embodiment, the restricting members 50*j*, 50*k* made of an insulating material may be mounted on and fixed to the end part of the conductive bar 44.

Figure 11:
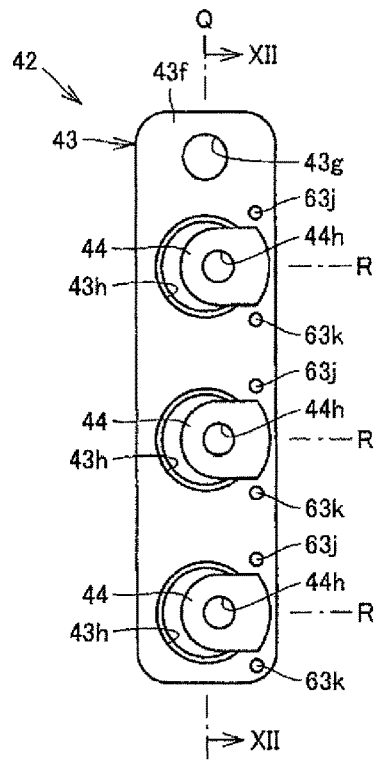
FIG. 11 is an explanatory view of a taken out mounting stand according to a third embodiment.
Figure 12:
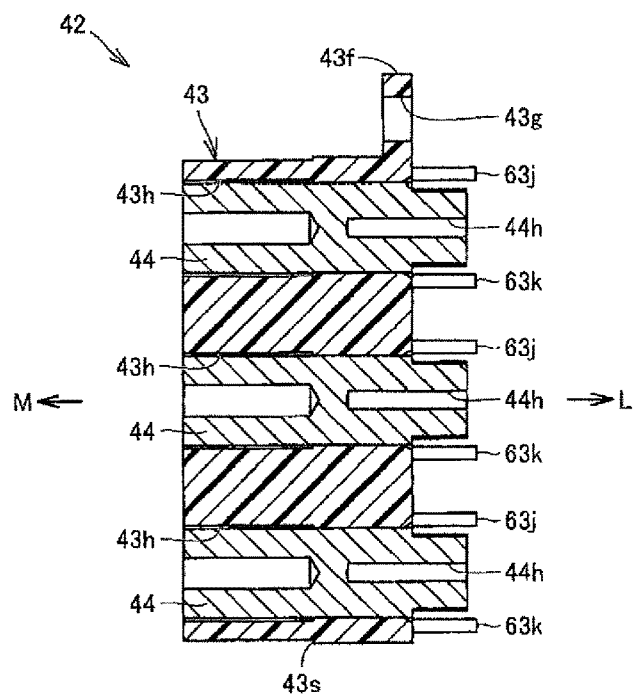
FIG. 12 is a cross-sectional view of the mounting stand taken along line of XII-XII of FIG. 11, as viewed from an arrow direction.

Next, a third embodiment of the present invention is described. FIG. 11 is an explanatory view of a taken out mounting stand according to the third embodiment as viewed from a side of a motor chamber L in a longitudinal direction of a conductive bar. FIG. 12 is a cross-sectional view of the mounting stand taken along line XII-XII of FIG. 11, as viewed from an arrow direction. In the third embodiment, the structure that is common to those of the embodiments described above is denoted by the same reference numeral and the description thereof is omitted. Only a structure that is different from those of the embodiments described above is described below.

According to the third embodiment, a pair of restricting members 63*j*, 63*k* is provided. The restricting members 63*j*, 63*k* are pins with a circular cross-section, a base end side of each of the restricting members 63*j*, 63*k* is integrally formed with a base 43, and a distal end side projects from an end surface of the base 43 on the side of the motor chamber L over an end part of a conductive bar 44 to reach a receive-side terminal 19. That is, a projecting end of each of the restricting members 63*j*, 63*k* projects further than an end surface of the conductive bar 44 which contacts a tongue piece 19*t* of the receive-side terminal 19 and to which the tongue piece 19*t* is fixed. The restricting members 63*j*, 63*k* are disposed to be symmetrical to each other with respect to a center line R and are placed on both sides of the receive-side terminal 19. The pin-shaped restricting members 63*j*, 63*k* are disposed on a base end side of the receive-side terminal 19 as viewed from a female screw hole 44*h*.

According to a terminal mounting structure of the third embodiment shown in FIG. 11, a pair of restricting members 63*j*, 63*k* functions as a contact prevention mechanism. Specifically, even if a screw 48 becomes loose and the receive-side terminal 19 rotates about the screw 48, the rotation range of the receive-side terminal 19 is restricted by a pair of restricting 63*j*, 63*k*. Accordingly there is no possibility that adjacent receive-side terminals 19, 19 contact with each other and a short-circuit occurs between the receive-side terminals 19, 19.

While the pin-shaped restricting members 63*j*, 63*k* are made of an insulating material that is similar to that of the base 43, as a modified example (not shown), the pin-shaped restricting members 63*j*, 63*k* may be integrally formed with the end part of the conductive bar 44. In this case, the restricting members 63*j*, 63*k* are made of a conductive material that is similar to that of the conductive bar 44.

Figure 13:
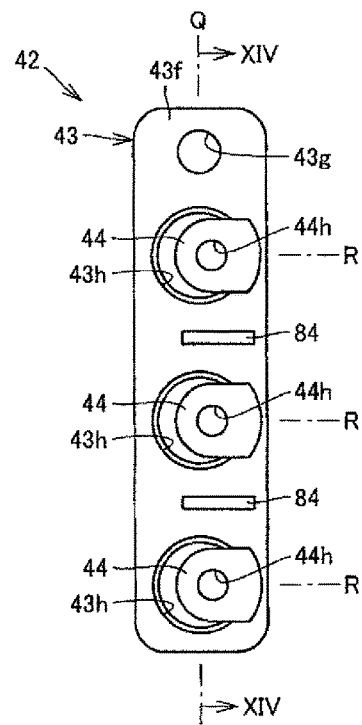
FIG. 13 is an explanatory view of a taken out mounting stand according to a fourth embodiment.
Figure 14:
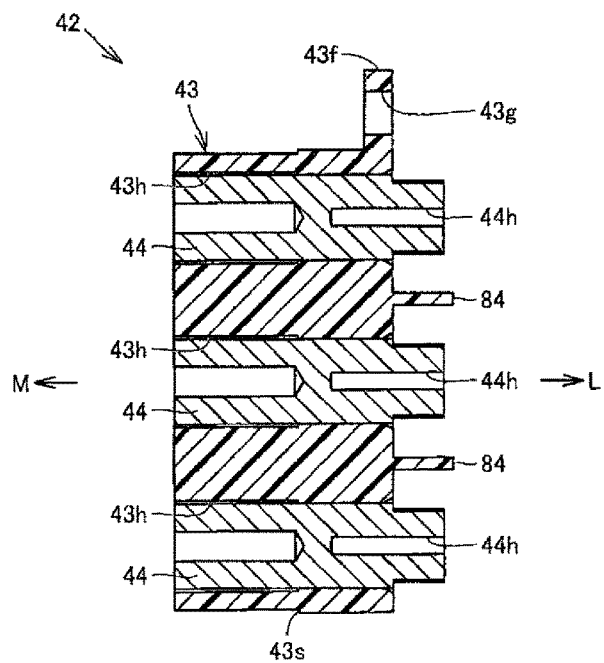
FIG. 14 is a cross-sectional view of the mounting stand taken along line of XIV-XIV of FIG. 13, as viewed from an arrow direction.

Next, a fourth embodiment of the present invention is described. FIG. 13 is an explanatory view of a taken out mounting stand according to the fourth embodiment as viewed from a side of a motor chamber in a longitudinal direction of a conductive bar. FIG. 14 is a cross-sectional view of the mounting stand taken along line XIV-XIV of FIG. 13, as viewed from an arrow direction. In the fourth embodiment, the structure that is common to those of the embodiments described above is denoted by the same reference numeral and the description thereof is omitted. Only a structure that is different from those of the embodiments described above is described below.

According to the fourth embodiment, a plurality of projecting parts 84 are provided on a base 43 of a mounting stand 42. Each projecting part 84 is made of an insulating material, a base end side of each projecting part 84 is integrally formed with an end surface of the base 43, and a distal end side projects over an end part of a conductive bar 44 to reach a receive-side terminal 19. That is, a projecting end of each projecting part 84 projects further than an end surface of the conductive bar 44 which contacts a tongue piece 19*t* of the receive-side terminal 19 and to which the tongue piece 19*t* is fixed. Each projecting part 84 is a wall that is disposed between adjacent receive-side terminals 19, 19 and extends across a reference line Q to be parallel to a center line R.

A terminal mounting structure according to the fourth embodiment shown in FIG. 13 includes the projecting part 84. The base end side of the projecting part 84 is provided on the mounting stand 42 and the distal end side of the projecting part 84 projects over the end part of the conductive bar 44 to be placed between adjacent receive-side terminals 19, 19. The projecting part 84 functioning as a contact prevention mechanism prevents the adjacent receive-side terminals 19, 19 from contacting with each other. Even if a screw 48 becomes loose and the receive-side terminal 19 rotates about the screw 48, the receive-side terminal 19 only abuts against the projecting part 84 and does not rotate over the projecting part 84. As a result, there is no possibility that the adjacent receive-side terminals 19, 19 contact with each other and a short-circuit occurs between the receive-side terminals 19, 19.

Figure 15:
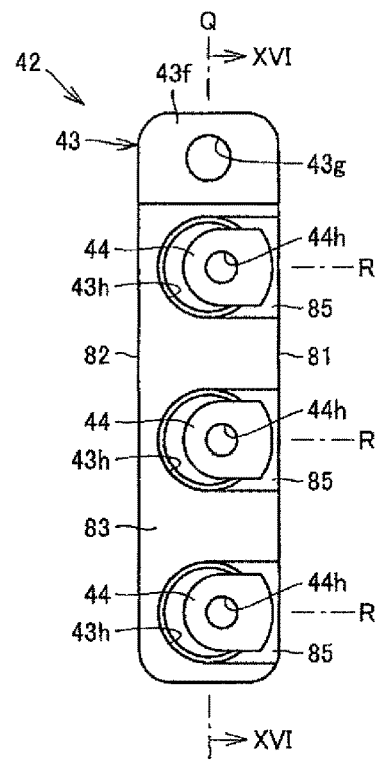
FIG. 15 is an explanatory view of a taken out mounting stand according to a fifth embodiment.
Figure 16:
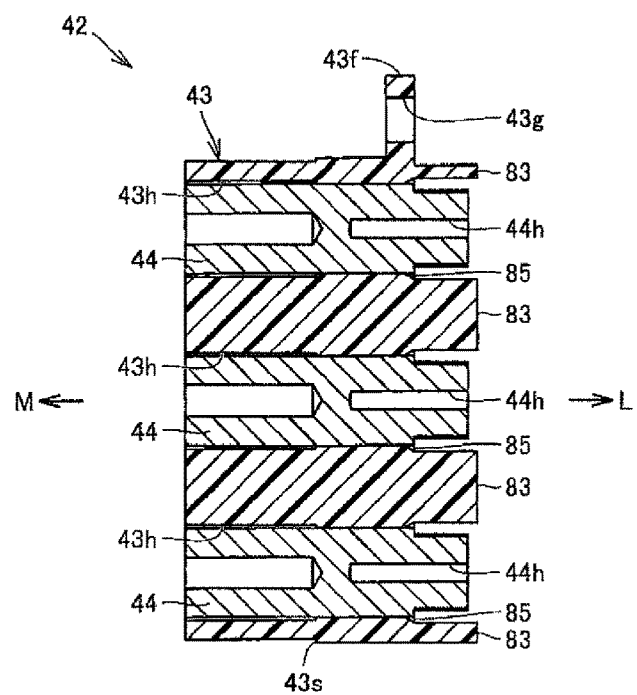
FIG. 16 is a cross-sectional view of the mounting stand taken along line of XVI-XVI of FIG. 15, as viewed from an arrow direction.

Next, a fifth embodiment of the present invention is described. FIG. 15 is an explanatory view of a taken out mounting stand according to the fifth embodiment as viewed from a side of a motor chamber in a longitudinal direction of a conductive bar. FIG. 16 is a cross-sectional view of the mounting stand taken along line XVI-XVI of FIG. 15, as viewed from an arrow direction. In the fifth embodiment, the structure that is common to those of the embodiments described above is denoted by the same reference numeral and the description thereof is omitted. Only a structure that is different from those of the embodiments described above is described below.

Three recessed parts 85 that receive receive-side terminals 19, respectively are formed in a base 43 according to the fifth embodiment. The recessed parts 85 are placed on an end surface of the base 43 on a side of a motor chamber L and disposed to be spaced apart from each other along a reference line Q. As shown in FIG. 15, each recessed part 85 is a cutout that extends from an edge part 81 on a side near a motor coil 17 along a center line R, and an edge part 82 on a side far from the motor coil 17 is not cut out and thus a projecting part 83 remains. The projecting part 83 has a comb-like shape as viewed from the side of the motor chamber L (FIG. 15), and a tip of a comb tooth of the projecting part 83 extends from the edge part 82 of the base 43 over the reference line Q to the edge part 81 of the base 43. As shown in FIG. 16, the projecting part 83 is formed to rise more than an end surface of a conductive bar 44 which contacts a tongue piece 19*t* of a receive-side terminal 19 and to which the tongue piece 19*t* is fixed.

A terminal mounting structure according to the fifth embodiment shown in FIG. 15 includes the projecting part 83. The projecting part 83 is a part of the base 43 that partitions adjacent recessed parts 85, 85 and is placed between adjacent receive-side terminals 19, 19. The projecting part 83 functioning as a contact prevention mechanism prevents the adjacent receive-side terminals 19, 19 from contacting with each other. Even if a screw 48 becomes loose and the receive-side terminal 19 rotates about the screw 48, the receive-side terminal 19 only abuts against the projecting part 83 and does not rotate over the projecting part 83. As a result, there is no possibility that the adjacent receive-side terminals 19, 19 contact with each other and a short-circuit occurs between the receive-side terminals 19, 19.

Figure 17:
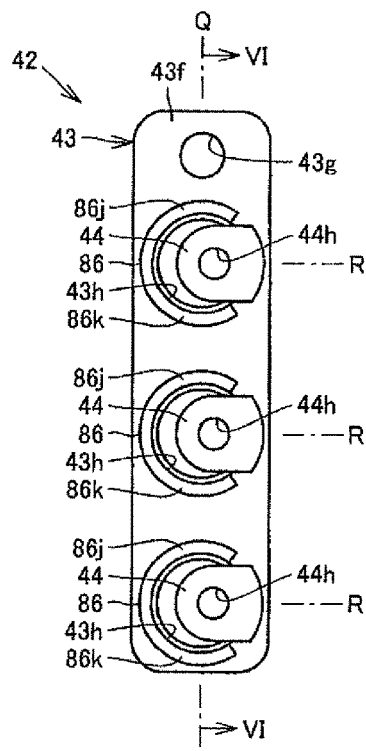
FIG. 17 is an explanatory view of a taken out mounting stand according to a sixth embodiment.

Next, a sixth embodiment of the present invention is described. FIG. 17 is an explanatory view of a taken out mounting stand according to the sixth embodiment as viewed from a side of a motor chamber in a longitudinal direction of a conductive bar. The sixth embodiment is a modification of the first embodiment. A terminal mounting structure according to the sixth embodiment includes a wall-like restricting member 86. A base end side of the restricting member 86 is integrally formed with a base 43, a distal end side of the restricting member 86 projects from an end surface of the base 43 on a side of a motor chamber L over an end part of a conductive bar 44 to reach a receive-side terminal 19. That is, a projecting end of the restricting member 86 projects further than an end surface of the conductive bar 44 which contacts a tongue piece 19$t$ of the receive-side terminal 19 and to which the tongue piece 19$t$ is fixed.

The restricting member 86 is a C-shaped wall that extends from one side part 86$j$ of the restricting member 86 to the other side part 86$k$ of the restricting member 86 so as to surround the receive-side terminal 19. Specifically, the one side part 86$j$ of the restricting member 86 extends along one side of the receive-side terminal 19 like the restricting member 46$j$ (FIG. 5) described above, the other side part 86$k$ of the restricting member 86 extends along the other side of the receive-side terminal 19 like the restricting member 46$k$ (FIG. 5) described above, and the one side part 86$j$ and the other side part 86$k$ extend along a distal end edge of the receive-side terminal 19 to be connected to each other. Here, when the restricting members 46$j$, 46$k$ according to the first embodiment are extended to be connected to each other, the restricting member 86 is formed.

According to the terminal mounting structure of the sixth embodiment shown in FIG. 17, the restricting member 86 functions as a contact prevention mechanism and thus prevents adjacent receive-side terminals 19, 19 from contacting with each other. Specifically, the receive-side terminal 19 is positioned between the one side part 86$j$ and the other side part 86$k$ so as not to be rotatable. Accordingly, even if a screw 48 becomes loose and the receive-side terminal 19 rotates about the screw 48, the rotation range of the receive-side terminal 19 is restricted by the one side part 86$j$ and the other side part 86$k$. As a result, there is no possibility that the adjacent receive-side terminals 19, 19 contact with each other and a short-circuit occurs between the receive-side terminals 19, 19.

Figure 18:
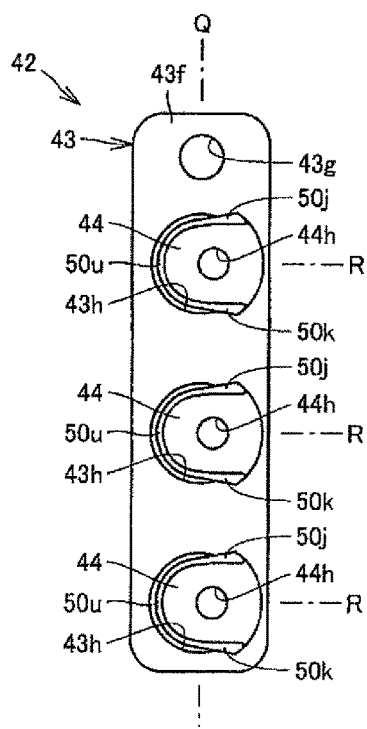
FIG. 18 is an explanatory view of a taken out mounting stand according to a seventh embodiment.

Next, a seventh embodiment of the present invention is described. FIG. 18 is an explanatory view of a taken out mounting stand according to the seventh embodiment as viewed from a side of a motor chamber in a longitudinal direction of a conductive bar. A terminal mounting structure according to the seventh embodiment is a modification of the second embodiment and a wall-like restricting member 50$u$ is integrally formed along an outer periphery of an end part of a conductive bar 44. The restricting member 50$u$ projects from an end surface of the conductive bar 44 on a side of a motor chamber L to reach a receive-side terminal 19. That is, a projecting edge of the restricting member 50$u$ projects further than the end surface of the conductive bar 44 which contacts a tongue piece 19$t$ of the receive-side terminal 19 and to which the tongue piece 19$t$ is fixed.

The restricting member 50$u$ extends in a U-shape from one side part 50$j$ of the restricting member 50$u$ to the other side part 50$k$ of the restricting member 50$u$ so as to surround the receive-side terminal 19. Specifically, the one side part 50$j$ of the restricting member 50$u$ extends along one side of the receive-side terminal 19 like the restricting member 50$j$ (FIG. 9) described above, the other side part 50$k$ of the restricting member 50$u$ extends along the other side of the receive-side terminal 19 like the restricting member 50$k$ (FIG. 9) described above, and the one side part 50$j$ and the other side part 50$k$ extend along a distal end edge of the receive-side terminal 19 to be connected to each other. That is to say, when the restricting members 50$j$, 50$k$ according to the second embodiment are extended to be connected to each other, the restricting member 50$u$ is formed.

According to the terminal mounting structure of the seventh embodiment shown in FIG. 18, the restricting member 50$u$ functions as a contact prevention mechanism and thus prevents adjacent receive-side terminals 19, 19 from contacting with each other. Specifically, the receive-side terminal 19 is positioned between the one side part 50$j$ and the other side part 50$k$ so as not to be rotatable. Accordingly, even if a screw 48 becomes loose, the receive-side terminal 19 does not rotate about the screw 48 and there is no possibility that the adjacent receive-side terminals 19, 19 contact with each other and a short-circuit occurs between the receive-side terminals 19, 19.

Figure 19:
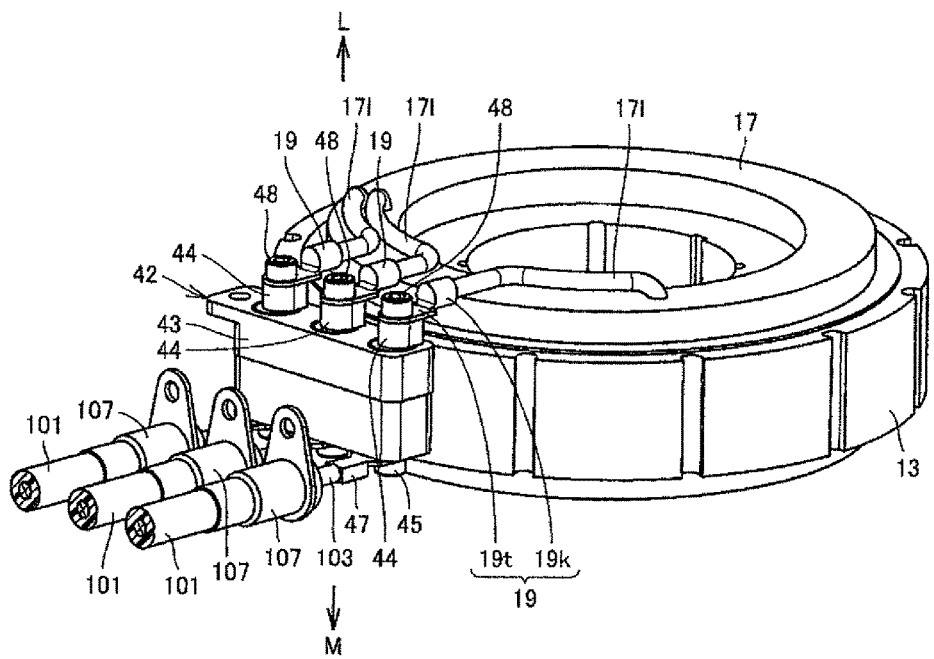
FIG. 19 is a perspective view of a taken out motor coil and a taken out terminal mounting structure according to a comparative example.
Figure 20:
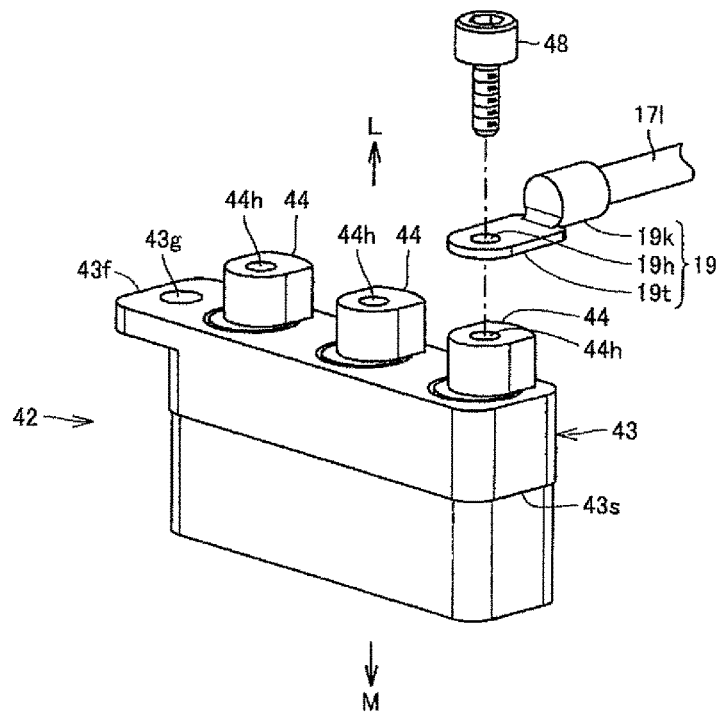
FIG. 20 is an exploded perspective view of a taken out mounting stand according to the comparative example.
Figure 21:
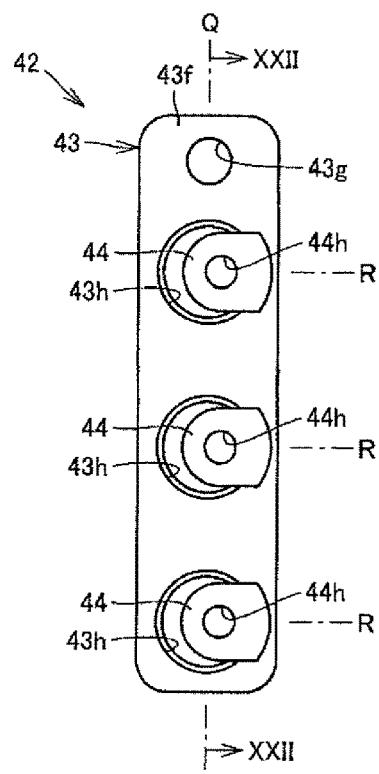
FIG. 21 is an explanatory view of the taken out mounting stand according to the comparative example.
Figure 22:
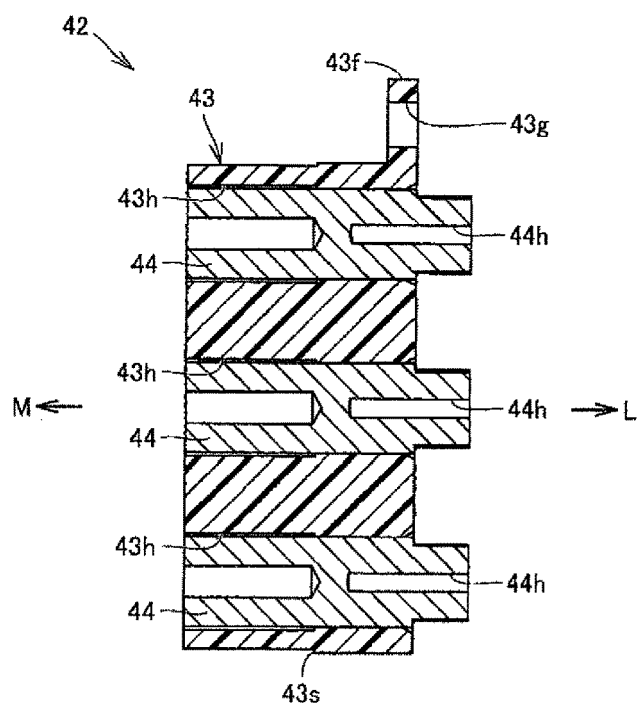
FIG. 22 is a cross-sectional view of the mounting stand according to the comparative example taken along line XXII-XXII of FIG. 21, as viewed from an arrow direction.

To aid understanding of the first to seventh embodiments described above, a comparative example is described. FIG. 19 is a schematic perspective view of a power line, a stator, a motor coil, and a terminal mounting structure according to the comparative example that are taken out of a vehicle motor drive device. FIG. 20 is an exploded perspective view of the taken out terminal mounting structure shown in FIG. 19. FIG. 21 is an explanatory view of a taken out mounting stand as viewed from a side of a motor chamber in a longitudinal direction of a conductive bar. FIG. 22 is a cross-sectional view of the mounting stand taken along line XXII-XXII of FIG. 21, as viewed from an arrow direction. A mounting stand 42 according to the comparative example does not include a pair of restricting members 46$j$, 46$k$ according to the first embodiment (FIGS. 3 to 6), a pair of restricting members 50$j$, 50$k$ according to the second embodiment (FIGS. 7 to 10), a pair of restricting members 63$j$, 63$k$ according to the third embodiment (FIGS. 11, 12), the projecting part 84 according to the fourth embodiment (FIGS. 13, 14), the projecting part 83 according to the fifth embodiment (FIGS. 15, 16), the C-shaped restricting member 86 according to the sixth embodiment (FIG. 17), and the U-shaped restricting member 50$u$ according to the seventh embodiment (FIG. 18).

According to the terminal mounting structure of the comparative example shown in FIGS. 19 to 22, a receive-side terminal 19 is not restricted or positioned. Accordingly, if a screw 48 becomes loose, the receive-side terminal 19 rotates about the screw 48, and there is a possibility that adjacent receive-side terminals 19, 19 contact with each other and a short-circuit occurs between the receive-side terminals 19, 19. The inventors have found that a short-circuit may occur in the comparative example and thus have developed the present invention in order to solve the problem.

Although the embodiments of the present invention have been described above with reference to the drawings, the present invention is not limited to the illustrated embodiments. Various modifications and variations can be made to the illustrated embodiments within a scope that is the same as, or equivalent to, that of the invention.

INDUSTRIAL APPLICABILITY

The terminal mounting structure according to the present invention is advantageously used in an electric car and a hybrid vehicle.

REFERENCE SIGNS LIST

11: in-wheel motor drive device (vehicle motor drive device)
11A: motor portion
11B: speed reduction portion
11C: wheel hub bearing portion
12: rotor
13: stator
14a: motor shaft
17: motor coil
17l: electrical lead
18: rotation number sensor
19: receive-side terminal
19h: through-hole
19k: caulk part
19t: tongue piece
21a, 21b: casing
21e: partition wall
21r: motor rear cover
22: terminal box
22a: first casing
22r: second casing
23: opening
24: path
41: partition wall
42: mounting stand
43: base
43f: fixing piece
43g: fixing hole
43h: through-hole
43s: step
44: conductive bar
44h: female screw hole
45: screw
46, 46j, 46k: restricting member
47: supply-side terminal
48: screw
49: cover
50j: restricting member (one side part)
50k: restricting member (the other side part)
50u: restricting member
63j, 63k: restricting member
81, 82: edge part
83, 84: projecting part
85: recessed part
86: restricting member
86j: one side part
86k: the other side part
101: power line
102: signal line
103: core line
105: cover plate
107: sleeve L: motor chamber
M: inner space
Q: reference line
R: center line

The invention claimed is:

1. A terminal mounting structure for a vehicle motor drive device comprising:
a plurality of electrical leads that extend from a motor coil of the vehicle motor drive device;
a plurality of receive-side terminals each of which extends from a distal end of each of the electrical leads;
a mounting stand that includes an electrically-insulating base and a plurality of supply-side conductive bars that are disposed at intervals and extend so as to pass through the base;
a plurality of screws, each of the plurality of screws passing through the receive-side terminal in a direction crossing an extending direction of the receive-side terminal, each of the plurality of screws is screwed into a screw hole formed at an end part of the supply-side conductive bar so as to cause each of the receive-side terminals to contact each of the supply-side conductive bars and to fix each of the receive-side terminals to each of the supply-side conductive bars, each screw hole being arranged eccentrically from a center axis of the conductive bar; and
a contact prevention mechanism that is provided in the mounting stand so as to prevent adjacent receive-side terminals from contacting with each other.

2. The terminal mounting structure for a vehicle motor drive device according to claim 1, wherein the contact prevention mechanism includes a restricting member that restricts a rotation of the receive-side terminal about the screw within a predetermined range.

3. The terminal mounting structure for a vehicle motor drive device according to claim 2, wherein the restricting member is a projection wherein a base end side thereof is provided on an end part of the supply-side conductive bar or on the base and a distal end side of the projection projects from the end part of the supply-side conductive bar so as to reach the receive-side terminal, the restricting member is disposed on one side and the other side of each receive-side terminal so as to be symmetrical to each other with respect to a center line of the receive-side terminal that extends in an extending direction of the receive-side terminal, and the restricting member restricts the rotation range of the receive-side terminal between a restricting member on one side and a restricting member on the other side.

4. The terminal mounting structure for a vehicle motor drive device according to claim 3, wherein base end sides of the restricting member on one side and the restricting member on the other side are integrally formed with an outer periphery of the end part of the supply-side conductive bar.

5. The terminal mounting structure for a vehicle motor drive device according to claim 3, wherein the restricting member on one side and the restricting member on the other side are a pair of walls extending along one side edge and the other side edge of the receive-side terminal, respectively.

6. The terminal mounting structure for a vehicle motor drive device according to claim 3, wherein the restricting member on one side and the restricting member on the other side extend along a distal end edge of the receive-side terminal so as to be connected to each other.

7. The terminal mounting structure for a vehicle motor drive device according to claim 1, wherein the contact prevention mechanism is a wall that stands on a base surface of the base and extends so as to cross a reference line that connects adjacent receive-side terminals.

8. The terminal mounting structure for a vehicle motor drive device according to claim 1, wherein a plurality of recessed parts that receive the respective receive-side terminals are formed in the base, and
the contact prevention mechanism is a part of the base that partitions adjacent recessed parts.

* * * * *